US011748406B2

(12) United States Patent
Tsingos et al.

(10) Patent No.: US 11,748,406 B2
(45) Date of Patent: Sep. 5, 2023

(54) AI-ASSISTED SOUND EFFECT EDITORIAL

(71) Applicant: Lucasfilm Entertainment Company Ltd. LLC, San Francisco, CA (US)

(72) Inventors: Nicolas Tsingos, San Francisco, CA (US); Scott Levine, San Anselmo, CA (US); Stephen Morris, San Francisco, CA (US)

(73) Assignee: Lucasfilm Entertainment Company Ltd. LLC, San Francisco, CA (US)

( * ) Notice: Subject to any disclaimer, the term of this patent is extended or adjusted under 35 U.S.C. 154(b) by 113 days.

(21) Appl. No.: 17/516,369

(22) Filed: Nov. 1, 2021

(65) Prior Publication Data

US 2023/0136632 A1 May 4, 2023

(51) Int. Cl.
| | |
|---|---|
| G06F 16/78 | (2019.01) |
| G06F 16/783 | (2019.01) |
| G06F 16/787 | (2019.01) |
| G06V 20/40 | (2022.01) |
| G06F 18/214 | (2023.01) |
| G06N 3/045 | (2023.01) |

(52) U.S. Cl.
CPC ........ *G06F 16/7834* (2019.01); *G06F 16/787* (2019.01); *G06F 16/7867* (2019.01); *G06F 18/214* (2023.01); *G06N 3/045* (2023.01); *G06V 20/40* (2022.01)

(58) Field of Classification Search
USPC .......................................... 386/241
See application file for complete search history.

(56) References Cited

U.S. PATENT DOCUMENTS

| | | | | |
|---|---|---|---|---|
| 8,988,512 | B2 * | 3/2015 | Chien ................. | H04N 13/383 348/57 |
| 9,270,964 | B1 * | 2/2016 | Tseytlin .............. | G11B 27/031 |
| 2014/0347481 | A1 * | 11/2014 | Kostrzewski ....... | H04N 19/467 375/240.08 |
| 2015/0052092 | A1 * | 2/2015 | Tang .................... | G06N 10/00 706/44 |
| 2016/0037139 | A1 * | 2/2016 | Bacus .................. | F21S 8/046 348/157 |

\* cited by examiner

*Primary Examiner* — Nigar Chowdhury
(74) *Attorney, Agent, or Firm* — Sheppard Mullin Richter & Hampton LLP

(57) ABSTRACT

Some implementations of the disclosure relate to a method, comprising: obtaining, at a computing device, first video clip data including multiple sequential video frames, the multiple sequential video frames including at least a first video frame and a second video frame that occurs after the first video frame; inputting, at the computing device, the first video clip data into at least one trained model that automatically predicts, based on at least features of the first video frame and features of the second video frame, sound effect data corresponding to the second video frame; and determining, at the computing device, based on the sound effect data predicted for the second video frame, a first sound effect file corresponding to the second video frame.

20 Claims, 9 Drawing Sheets

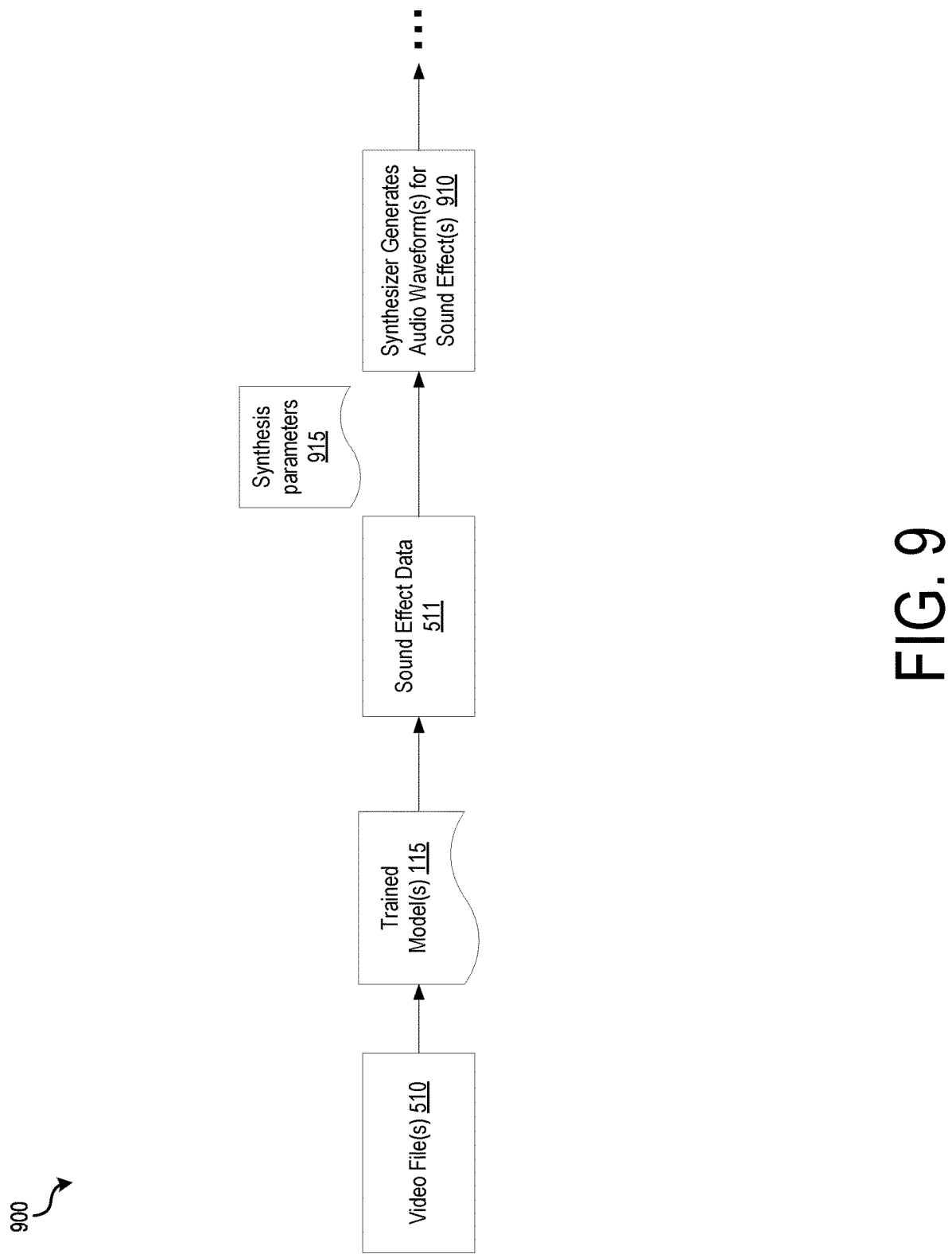

AI-ASSISTED SOUND EFFECT EDITORIAL

BRIEF SUMMARY OF THE DISCLOSURE

Implementations of the disclosure describe systems and methods that leverage machine learning to automatically determine sound effects for a given input video.

In one embodiment, a non-transitory computer-readable medium having executable instructions stored thereon that, when executed by a processor, cause a system to perform operations comprising: obtaining first video clip data including multiple sequential video frames, the multiple sequential video frames including at least a first video frame and a second video frame that occurs after the first video frame; inputting the first video clip data into at least one trained model that automatically predicts, based on at least features of the first video frame and features of the second video frame, sound effect data corresponding to the second video frame; and determining, based on the sound effect data predicted for the second video frame, a first sound effect file corresponding to the second video frame.

In some implementations, determining the first sound effect file corresponding to the second video frame comprises: mapping, using at least a sound effect datastore comprising multiple sound effect files that include the first sound effect file, the sound effect data predicted for the second video frame to the first sound effect file. In some implementations, the sound effect data predicted for the second video frame comprises a type or label; and mapping, using at least the sound effect datastore, the sound effect data predicted for the second video frame to the first sound effect file, comprises: selecting, based on the type or label, the first sound effect file from the multiple sound effect files.

In some implementations, the sound effect data predicted for the second video frame comprises a sound effect signature comprising one or more sound features; and mapping, using at least the sound effect datastore, the sound effect data predicted for the second video frame to the first sound effect file, comprises: comparing the one or more sound features of the sound effect signature to sound features of the multiple sound effect files in the sound effect datastore to determine a similarity between the sound effect signature and each of the multiple sound effect files; and determining that the first sound effect file has the highest similarity to the sound effect signature.

In some implementations, the sound effect data predicted for the second video frame comprises: location data indicating a sound effect location, or gain data indicating a sound effect level; and the operations further comprise: assembling, based at least on the panning location data, one or more media files including the second video frame the first sound effect, and metadata indicating the sound effect location or the sound effect level in the second video frame.

In some implementations, the multiple sequential video frames further include a third video frame that occurs after the second video frame; and the at least one trained model automatically predicts, based on at least the features of the first video frame, the features of the second video frame, and features of the third video frame, the sound effect data corresponding to the second video frame.

In some implementations, the operations further comprise: prior to inputting the first video clip data into the at least one trained model, decoding and downsampling each of the first video frame, the second video frame, and the third video frame.

In some implementations, the at least one trained model automatically predicts, based on at least the features of the first video frame, the features of the second video frame, the features of the third video frame, and sound effect data previously predicted for the first video frame, the sound effect data corresponding to the second video frame.

In some implementations, the at least one trained model comprises a sequence to sequence model including an encoder and a decoder, wherein: the encoder is configured to extract the features of the first video frame, the features of the second video frame, and the features of the third video frame; and the decoder is configured to: predict the sound effect data for the first video frame; and predict, using at least the features of the first video frame, the features of the second video frame, the features of the third video frame, and the sound effect data previously predicted for the first video frame, the sound effect data for the second video frame. In some implementations, the encoder comprises a time-distributed convolutional neural network (CNN). In some implementations, the decoder comprises a multilayer perceptron (MLP) or forward long short-term memory (LSTM) network.

In some implementations, the operations further comprise: obtaining metadata indicating a category of the first video clip data; and inputting the metadata into the at least one trained model, wherein the at least one trained model automatically predicts, based on at least the features of the first video frame, the features of the second video frame, and the metadata, the sound effect data corresponding to the second video frame.

In some implementations, the at least one trained model includes a first model configured to predict data associated with a first type of sound effect, and a second model configured to predict data associated with a second type of sound effect; inputting the first video clip data into the at least one trained model, comprises: inputting the first video clip data into each of the first model and the second model; and the sound effect data corresponding to the second video frame comprises first sound effect data predicted by the first model for the first type of sound effect, and second sound effect data predicted by the second model for the second type of sound effect.

In some implementations, the operations further comprise: assembling a first sound effect track including the first sound effect file and a playback time of the first sound effect file; and presenting a user interface including an editable sound effects session, the editable sound effects session including one or more controls for playing back or editing the first sound effect track.

In some implementations, determining, based on the sound effect data predicted for the second video frame, the first sound effect file corresponding to the second video frame, comprises: determining, based on the sound effect data predicted for the second video frame, multiple sound effect files potentially corresponding to the sound effect data predicted for the second video frame, the multiple sound effect files including the first sound effect file; presenting, via a user interface, the multiple sound effect files potentially corresponding to the sound effect data predicted for the second video frame; and receiving data corresponding to user input at the user interface selecting the first sound effect file from the multiple sound effect files.

In some implementations, the operations further comprise: obtaining music data and dialogue data corresponding to the multiple sequential video frames; assembling a soundtrack comprising the music data, the dialogue data, and sound effect data corresponding to the first sound effect file; and combining the multiple sequential video frames with the soundtrack into a media package.

In some implementations, the sound effect data predicted for the second video frame comprises one or more audio synthesis parameters; and determining the first sound effect file corresponding to the second video frame, comprises: synthesizing, using at least the one or more audio synthesis parameters, the first sound effect file.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 9 is a flow diagram illustrating an example method of using synthesis parameters output by a model to generate sound effect files for video frames, in accordance with implementations of the disclosure.

Figure 1:
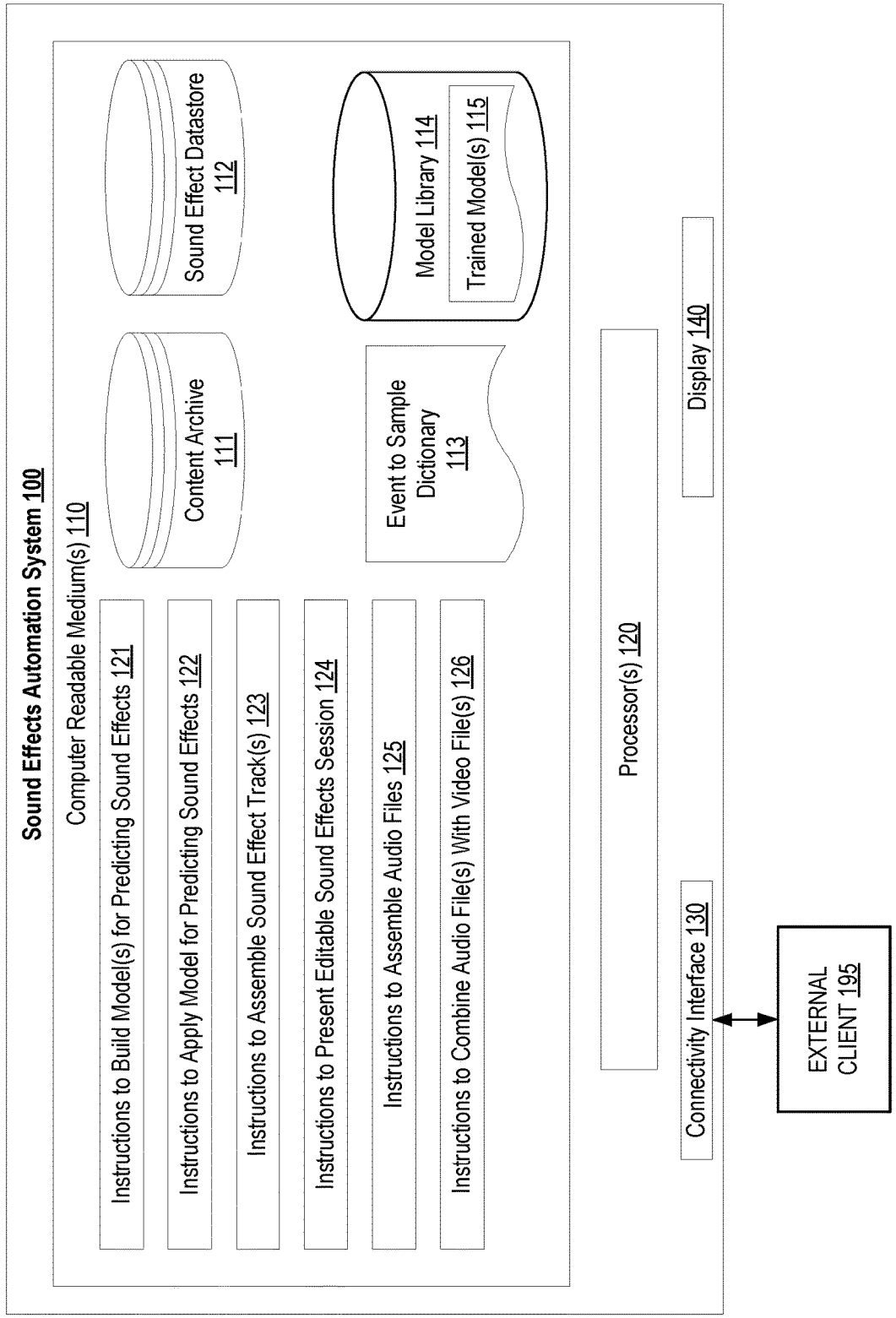
FIG. 1 is a block diagram illustrating a sound effects automation system that may implement the techniques described in the present disclosure.

The figures are not exhaustive and do not limit the disclosure to the precise form disclosed.

DETAILED DESCRIPTION

The process of soundtrack creation for both feature, episodic, short form, and interactive content involves the capture and generation of multiple sounds to produce a complete experience containing dialog, music, and sound effects. Often, sound effects cannot be fully captured during on set production, or simply do not exist, in the case of animation. This fact has led to a need for a specialized workflow in which a human sound editor creatively selects audio clips to synchronize with visual cues in the production video. Such audio clips may be recorded purposefully for the specific action on-screen, or retrieved from a library from previous projects.

To adequately create the expected soundtrack experience defined by decades of consistent aesthetic, the sound effects editors may need to insert thousands of sounds over the length of the content, covering a multitude of visual cues seen on-screen at any given moment. Each audio clip inserted is carefully synchronized to correspond naturally with the visual cue, taking into account unconscious but intuitive visual features such as object speed, distance from camera, scene boundaries, and position on-screen. For example, an intense space battle sequence may contain dozens of individual laser gun shots, impacts, etc. that need to be precisely edited to synchronize with the video. Such careful technical insertion detail, paired with creative focus on selecting the proper sound for each cue results in a very time consuming and repetitive process, often requiring weeks of labor with multiple editors for a given production. As such, the human/manual workflow still remains a predominant method in which to create the sound effects component within a project's soundtrack.

With contracting production timelines and demand for higher production value at lower budget tiers, there exists a need for more efficiency and flexibility in the sound editorial workflow. Rote and repetitive tasks can be more suited for an automated procedural system, leaving an editor more ability to focus on creative choices, leading to more compelling content and security in meeting production goals and timelines.

To this end, implementations of the disclosure are directed to utilizing a model trained on visual clips and their associated sound effects to automate the process of sound effect editing. The systems and methods described herein may be configured to use the trained model to generate a synchronized sound effect session including information about multiple sound effects for a given input video file or files. The session can include: 1) the timing of the sound effect events; 2) a type and/or label of each sound effect; 3) an audio sample or audio synthesis parameters associated with each sound effect; 4) learned sound features; 5) additional mixing parameters (e.g., gain, distance, or panning information) associated with each sound effect; and/or 6) a generation of non-overlapping track groups.

In some implementation, the systems and methods described herein may output a sound effects session with sound effects audio clips prepopulated on a timeline for manual adjustment. This sound effects session may be used as a starting point directly generated from video, allowing sound designers and/or editors to more effectively sound design, fine-tune, and/or quality control the final result. As further discussed below, selection of audio clips available may be configured with a user specified sample-to-event dictionary, interfacing with sound effect databases. Similarly, visual event classification data may contribute towards automated inference of clip selection based on metadata tags.

In other implementations, the systems and methods described herein may be used to generate a full end-to-end pipeline resulting in a complete sound effect soundtrack. This may be particularly advantageous for low budget or heavily time-constrained shows, where the end-to-end process may be fully automated and may also apply to automated audio previews during production, e.g., for dailies or even on-set.

Additionally, such implementations may serve to elucidate previously unconsidered creative ideas and concepts.

For example, there is the potential for subtle visual cues otherwise overlooked to be given recognition via a generated sound effect, leading the sound editor to design the scene in a different way than if they did not notice the cue.

By virtue of implementing the systems and methods described herein, the process of sound effect editorial may be significantly improved. For example, there is the potential to reduce the process from hundreds of hours in manual labor for a single production to minutes, with the option for manual refinement and creative adjustment. This may permit the creation of a far greater amount of content in an efficient matter. All content requiring sound tracks could potentially benefit from the systems and methods described herein for generating sound effects autonomously. For example, production and post-production segments of theatrical, broadcast, streaming, and/or interactive studios could realize the benefits described herein. The techniques described herein may benefit previsualization, interactive, picture editorial, dailies, and post production.

FIG. 1 is a block diagram illustrating a sound effects automation system 100 that may implement the techniques described in the present disclosure. System 100 may implemented as one or more servers and/or one or more client devices. In some implementations, the components of system 100 may be distributed over a communications network.

The sound effects automation system 100 comprises at least one computer readable medium 110 upon which are stored instructions that, when executed by a processor 120, cause server system 100 to carry-out implementations of the disclosure. Server system 100 further comprises, at least one processor 120, a connectivity interface 130, and a display 140. In this example, at least one computer readable medium 110 stores a content archive 111, a sound effect datastore 112, an event to sample dictionary 113, and a model library 114 that stores at least one trained model 115.

Content archive 111 may include one or more datastores containing a prior record of data associated sound mixes for different media content items (e.g., sound effect data, and/or video data for different movies and/or television shows) that may be leveraged to build a model for automatically deriving sound effect data given at least video data (and in some cases sound effect data for prior video frames) as an input. For example, a producer or distributor may leverage decades of soundtracks, including sound effect data, and associated video data, that have been produced for films and/or television series. A given movie or show may have a sound mix version created in a DOLBY ATMOS theatrical format, a DOLBY ATMOS home format, a DTS format, a broadcast format, a 7.1 Format, a 5.1 Format, a Stereo format, a Binaural format, or some other suitable audio format. A content archive 111 may have sound effect data associated with the sound effects in the soundtrack, including the timing (e.g., video frame or timecode) of the sound effect events in the movie or show, a type and/or label of each sound effect, an audio sample or audio synthesis parameters associated with each sound effect, and/or other information (e.g., gain, distance, or panning) associating a sound effect with a video frame.

Sound effect datastore 112 may contain information or audio samples of sound effects used in past productions such as movies or shows. For each sound effect, it may include an audio sample of a sound effect, audio synthesis parameters associated with a sound effect, an identifier (e.g., numerical ID or label identifying a specific sound effect) of a sound effect, a type or category of a sound effect (e.g., footsteps, gunshots, wind, rain, etc.) and other information associated with a sound effects. In some cases, sound effect datastore 112 is a component of content archive 111. Alternatively, it may be implemented independent of content archive 111. As further discussed below, sound effect datastore 112 may be leveraged during a process for automating sound effects editing. A trained model 115 may predict a type or other parameters of a sound effect for a given timecode or video frame, and the predicted type or other parameters may be used to obtain one or more sound effects from datastore 112. The datastore 112 may be incorporated into sound effects editing software that is downloaded and/or accessed over a communications network.

The at least one computer readable medium 110 also stores instructions 121 that, when executed by a processor 120, cause system 100 to build a model (e.g., trained model 115) for predicting sound effects. As further discussed below, the output of the model may include data associated with a sound effect such as a type of the sound effect, synthesis parameters associated with the sound effect, and the like. The at least one computer readable medium 110 also stores instructions 122 that, when executed by a processor 120, cause sound effects automation system 100 to apply the trained model 115 for predicting sound effects. The at least one computer readable medium 110 further stores instructions 123 that, when executed by a processor 120, cause sound effects automation system 100 to assemble one or more sound effect tracks. The at least one computer readable medium 110 further stores instructions 124 that, when executed by a processor 120, cause sound effects automation system 100 to present an editable sound effects session. The at least one computer readable medium 110 also stores instructions 125 that, when executed by a processor 120, cause sound effects automation system 100 to assemble audio files. The at least one computer readable medium 110 further stores instructions 126 that, when executed by a processor 120, cause sound effects automation system 100 to combine one or more audio files with one or more video files.

In some implementations, one or more of instructions 121-126 may be integrated as part of a media editing application such as a sound editing application. For example, instructions 121-125 may be executed as part of a sound editing application that is run on a desktop or mobile device. In some cases, one or more of the instructions may be executed by a server system that provides a cloud-based or web-based application for sound editing.

Connectivity interface 130 is configured to provide sound effects automation system 100 with wired and/or wireless communication with one or more external clients 195 via a direct and/or indirect connection over one or more communication networks.

Display 140 may be used to present an editable sound effects session or other data associated with a media editing application.

Figure 2:
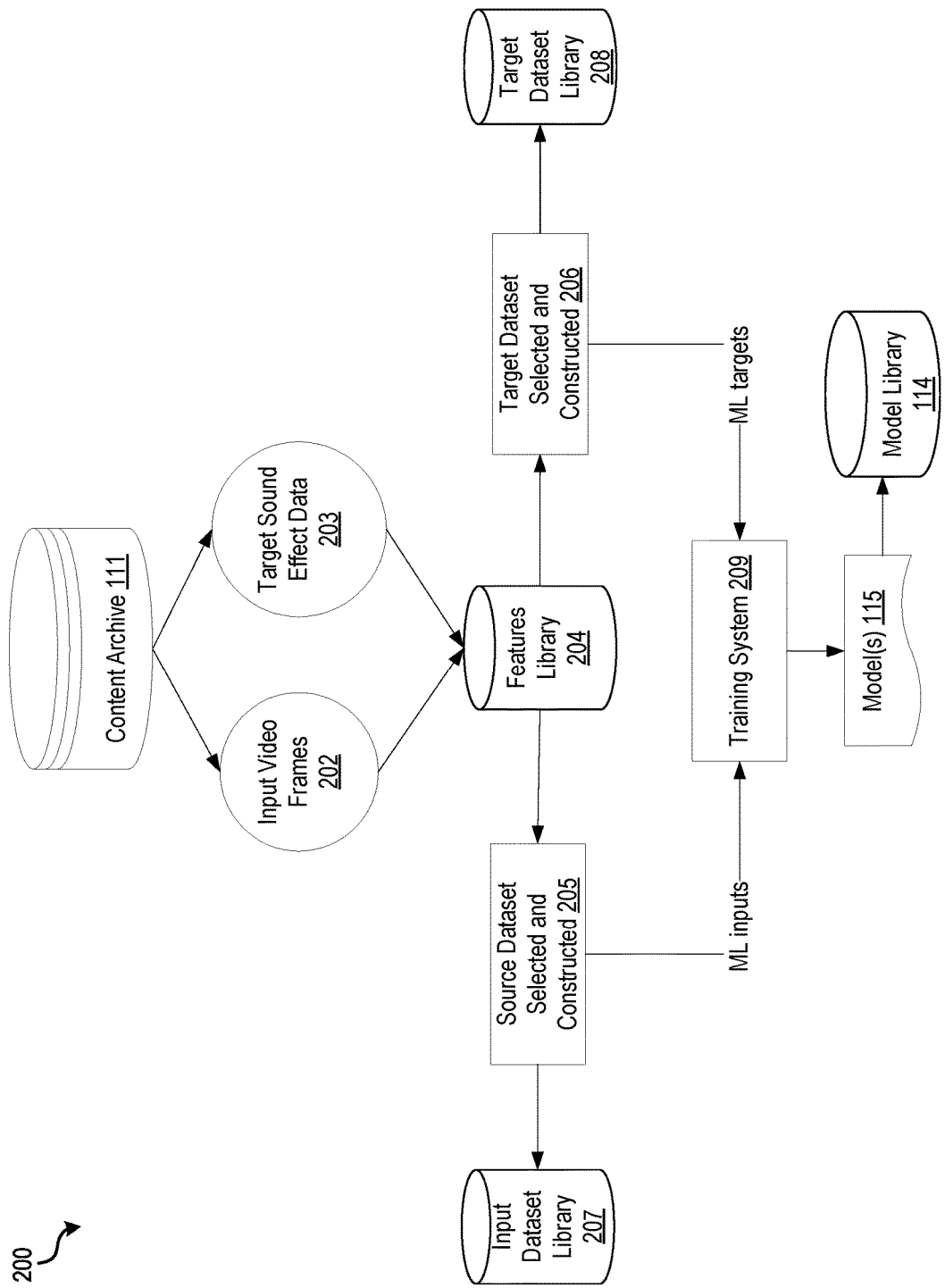
FIG. 2 is a flow diagram illustrating an example method of preparing and using a dataset for constructing one or more trained models that predict sound effect data for a given video, in accordance with implementations of the disclosure.

FIG. 2 is a flow diagram illustrating an example method 200 of preparing and using a dataset for constructing one or more trained models 115 that predict sound effect data for a given video, in accordance with implementations of the disclosure. The steps of method 200 may be implemented using a processor 120 of a sound effects automation system 100 that executes one or more instructions (e.g., instructions 121) stored in a computer readable medium 110.

As discussed above, a content archive 111 may store historical data associated with sound effects, including sounds effects data, video frames, and the like. To prepare a dataset for constructing one or more models 115, data obtained from content archive 111 includes both inputs and targets.

The inputs include input video frames 202. As further described below, the input video frames 202 may be assembled into short video clips including a series of video frames for which sound effect data is predicted. Other inputs to the model in addition to the video frames may include metadata (not shown in FIG. 2) that could influence what audio samples will be inferred in response to the video frames. For example, categorization metadata may be extracted that identifies a production studio, a genre, a filmmaker, a type of media content (e.g., feature film, animation film, short, teaser, television episode, VR content, etc.), or other feature of the content associated with the video frames. In implementations, categorization metadata may be extracted via the use of an accompanying sidecar descriptive metadata file, from data contained within the header of the digital video files of the content, and/or from an embedded digital token/watermark. The inputs are fed into a features library 204.

The targets include target sound effect data 203. The target sound effect data 203 may include, for example, the timing (e.g., timecode or video frame) of sound effect events; a type and/or label of each sound effect; audio synthesis parameters associated with each sound effect; learned sound features and/or additional mixing parameters (e.g., gain, distance, or panning information for each video frame) associated with each sound effect.

In implementations where the target sound effect data 203 includes learned sound features, the learned sound features may include features or embeddings representative of the audio sample or track that could be extracted via a pre-trained network optimized for a task such as sound classification.

In another implementation, audio analysis and audio feature extraction may be performed on sound effect tracks to extract target sound effect data. The extracted data may represent sonic and content components of the sound effects. These features may be extracted via signal processing tools, operating on audio signals of the content archive 111 to derive quantifiable data about the content of the sound effects. Such tools may look at aspects such as frequency spectrum, phase coherence, volume/gain dynamic range, spatial energy, and/or waveform shape.

The targets, including the target sound effect data 203, are fed into features library 204.

To prepare the model for construction, including training and testing, a source dataset is selected from features library 204 and constructed (operation 205) to form an input/source dataset library 207, and a target dataset is selected from features library 204 and constructed (operation 206) to form a target dataset library 208. The source dataset provides inputs for machine learning, and the target dataset provides targets/outputs for machine learning. The inputs may be selected from the input data described above, and the targets may be selected from the target data described above. It should be noted that input and targets may be somewhat coupled. For example, they may be obtained for the same reference digital audio workstation sessions.

The output dataset may include sound effect data corresponding to each video frame. The input dataset may be assembled by constructing a series of short video clips including multiple video frames. Each video clip includes a video frame of interest (i.e., frame for which sound effect data is predicted), and one or more video frames that occur before the video frame of interest, and one or more video frames that occur after the video frame of interest. For example, a video clip may include three video frames with the video frame of interest being the second video frame, five video frames with the video frame of interest being the third video frame, etc. Additionally, the input dataset may include metadata associated with video frames in the video clip. Given the features of the video frames of a video clip, the metadata, and previously predicted sound effects in video frames that occur before the video frame of interest (e.g., center video frame) in the video clip, the model may be trained to output a prediction of sound effect data corresponding to the video frame of interest.

Alternatively, in some implementations the model may predict the sound data one-to-one for each video frame in the sequence (past the frame of interest). In such implementations, each input video frame may have an associated audio data target. The model may then predict further than just the next frame of interest.

In this example, a training system 209 is used to build the machine learning model(s) 115. The one or more models 115 may be stored in a model library 114 for future use. The training system 209 may build the one or more models 115 by splitting the datasets into a training dataset and a testing dataset, where each of the training dataset and the testing dataset includes a subset of the source dataset and target dataset. For example, the training dataset may comprise a majority of the dataset (e.g., 60%, 70%, 80%, etc.). The datasets may be randomized, prior to splitting, to ensure an equal distribution of patterns of data.

During machine learning, a model may be initialized to perform training using the training dataset. During initialization of the model, hyperparameters of the algorithms may be set. The model may be initialized by selecting one or more supervised learning algorithms that learn patterns using known inputs and known outputs. For example, a known input may include a video clip, and a known output may include the sound effect data of a video frame of interest in the video clip. Another known input may include metadata categorizing the content associated with the video clip. As such, using one or more of the aforementioned supervised learning algorithms, a machine may analyze and determine relationships between sound effect data and video feature data (and, optionally, metadata) in the training data to develop a model that may calculate sound effect data of a video frame of interest. The relationships may include both spatial and temporal relationships between video frames and sound effect data. Additionally, temporal relationships between sound effect data occurring in different video frames may be determined. In some cases, multiple models 115 may be trained. For example, a target output of one model may be sound effect data for sound effects of a first type, and a target output of another model may be sound effect data for sound effects of a second type.

Supervised learning algorithms such as neural networks, linear regression, logistic regression, decision trees, k-nearest neighbors, and/or support vector machines may be utilized. In other implementations, unsupervised learning algorithms may be utilized to initialize the model. For example, unsupervised neural networks, k-means clustering, principal and independent component analysis, association rules, or other suitable unsupervised learning algorithms may be used. In some implementations, semi-supervised learning algorithms or a combination or supervised and unsupervised learning algorithms may be used. In some implementations, an ensemble model that combines multiple statistical modeling techniques may be utilized.

The model developed during training may be tested using the testing dataset. For example, a video clip (and in some implementations, categorization metadata) may be provided to the trained model to calculate sound effect data for a video frame of interest in the video clip. As new sound effect data is predicted, the trained model may also recursively input sound effect data occurring in the video clip before the video frame of interest. The sound effect data that is calculated by the model for each video frame may thereafter be compared with the actual, known sound effect data of the video frame in the testing dataset to determine a difference (e.g., mean absolute error) between the calculated/predicted sound effect data and actual sound effect data. As such, the performance of the model may be calculated from testing (e.g., as an average error score for all predictions). If the average error score is too high, additional iterations of model initialization, training, and/or testing may be performed. For example, hyperparameters of the algorithms used in the model may be adjusted, the algorithms of the model may be changed, and/or different features of data may be considered in the model. Alternatively, if model performance is satisfactory, the model may be made available to predict sound effect data.

In some implementations, each video frame (e.g., raw RGB pixels) may be decoded (e.g., from their possibly compressed video format) and downsampled to a lower resolution using a suitable downsampling filter (e.g. bicubic, lanczos, etc.) before being fed directly into the model. For example, the initial video could be an mp4 h.264 stream 1080p or 4K, but each video frame would be first decoded and downsampled to, for example, 480×200 pixels or lower for efficiency before being fed into the model. At inference time, this may be done in a streaming fashion, with each new frame being decoded in turn as the video is being processed. As the network may generally require multiple consecutive frames as input, the previous K downsampled frames may be cached in a queue. For training, the entire set of required low-resolution raw frame data could be precomputed/cached for the entire training set.

Figure 3:
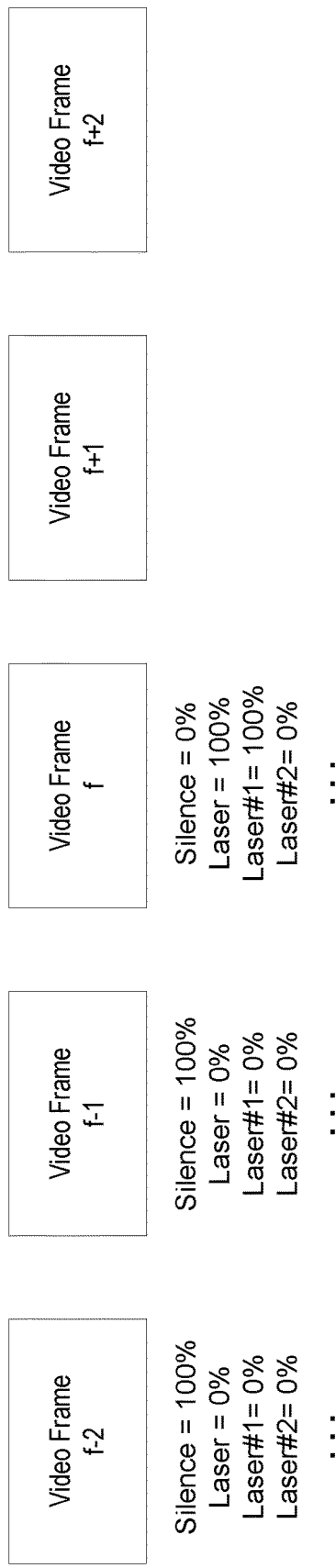
FIG. 3 conceptually illustrates how a trained model may operate in accordance with implementations of the disclosure.
Figure 3:
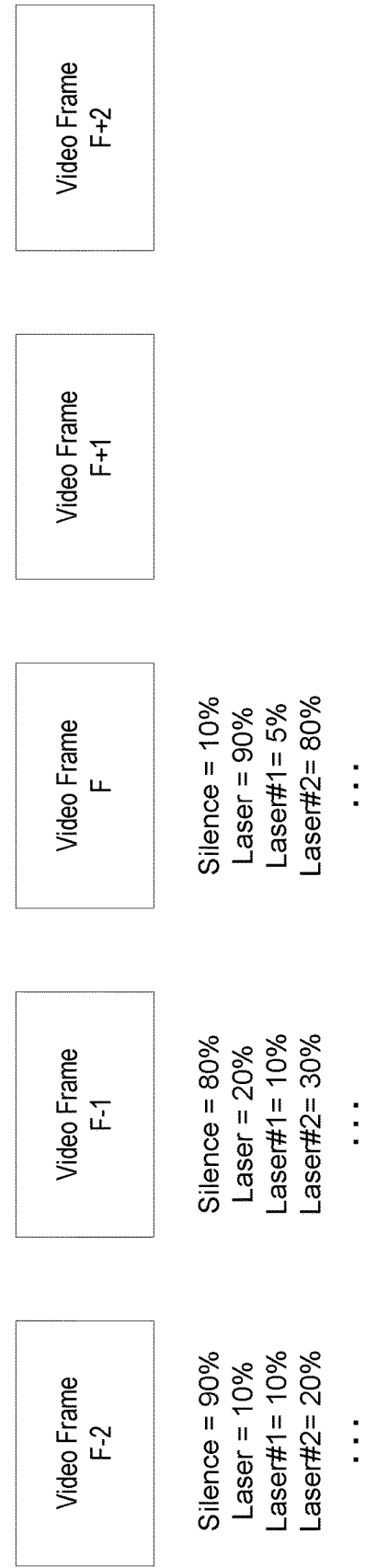

FIG. 3 conceptually illustrates how a trained model may operate in accordance with implementations of the disclosure. As illustrated, during training, a collection of small video clips are used to optimize a sound effect data prediction output for a given frame f based on reference context. The reference context in this example includes video frames (f−2, f−1, f+1, f+2) that occur before and after the frame of interest (f). In alternative implementations, only one or more video frames that occur before the video frame of interest are included. The reference context in this example also includes the past state of sound effect data in prior video frames. For example, the past state may indicate the presence of laser sound effects or silence. Although five video frames per video clip are used in this example, it should be noted that a different number of video frames in the neighborhood of a video frame f may be used. During the inference stage, a state of a frame of interest F is predicted in turn given past predictions (e.g., predictions of F−2 and F−3 inform prediction of F−1, predictions of F−1 and F−2 inform prediction of F, etc.)

The trained model may generally be implemented as a sequence to sequence model where the input is the video frame sequence and the output is the sound effect data sequence corresponding to each video frame. As one goal of the model is to keep track of some previous state, the previous state of inferred data may also be given to the synthesis model (e.g., in the architecture of FIG. 4, which has no explicit RNN on output). In a 'teacher forcing' manner, the previous reference inputs are given during training while during inference the previous inferred outputs are given.

Figure 5:
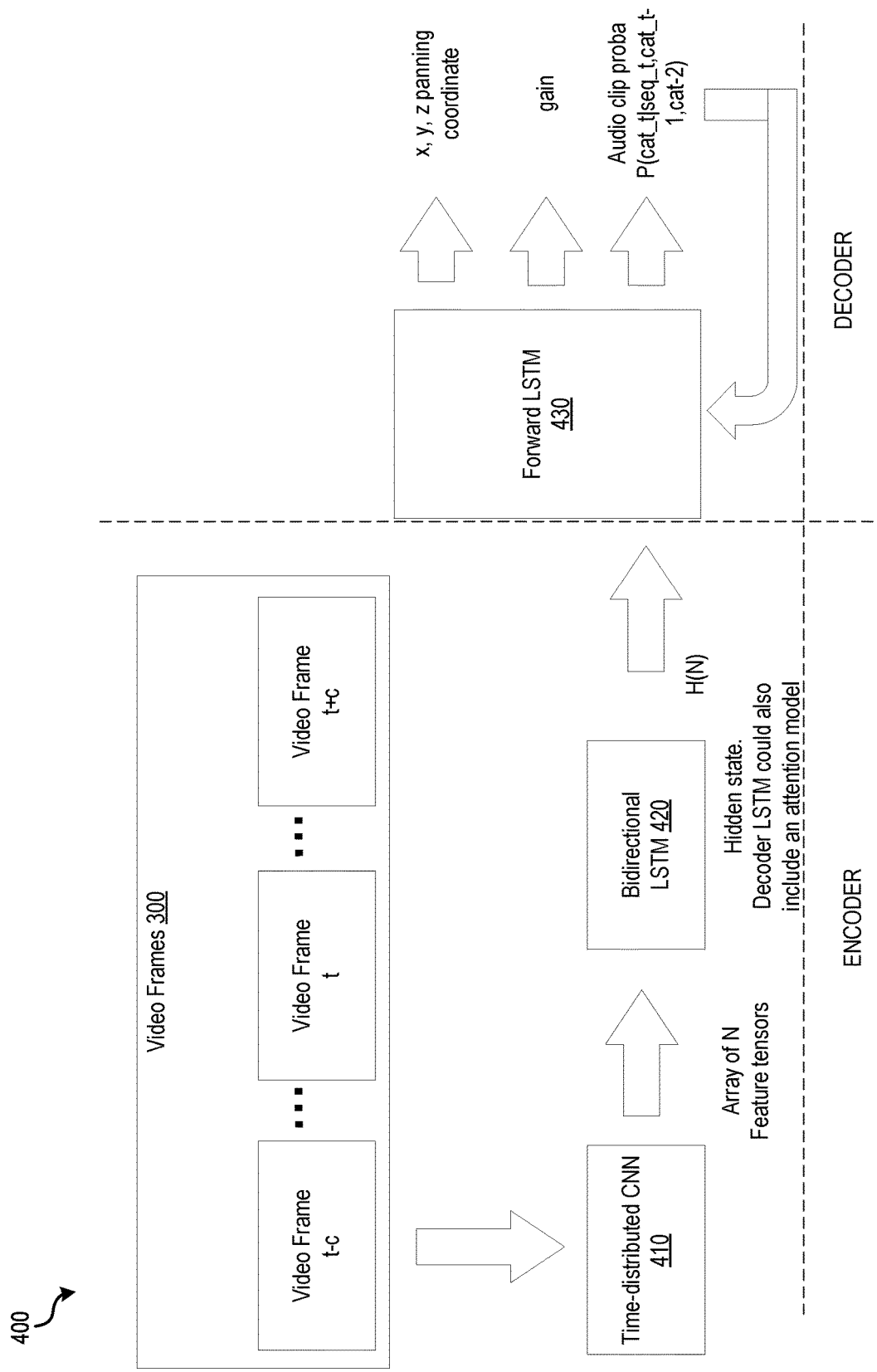
FIG. 5 illustrates another example of a model including an encoder and decoder, in accordance with implementations of the disclosure.

If the model architecture is recursive, the state may be captured implicitly in the hidden state of the output (e.g., RNN 430 in FIG. 5). A combination of forcing the previous reference inputs or not could be used during training.

Figure 4:
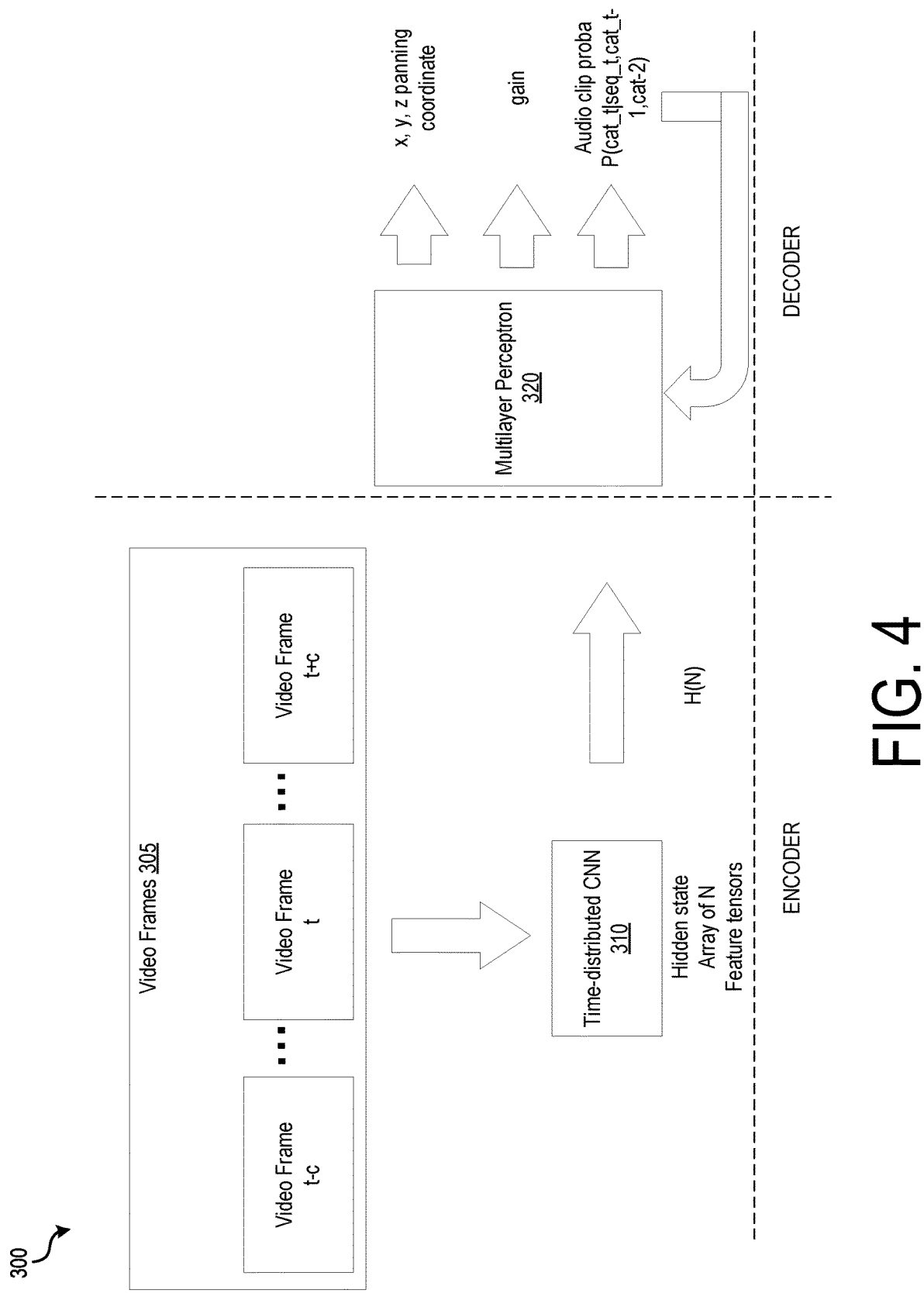
FIG. 4 illustrates an example of a model including an encoder and decoder, in accordance with implementations of the disclosure.

In specific implementations of the disclosure, a sequence to sequence model including an encoder and decoder may be built to predict sound effect data given input video frames corresponding to a video clip. For example, FIG. 4 illustrates an example of a sequence to sequence model 300 including an encoder and decoder, in accordance with implementations of the disclosure. In this example, the encoder includes a time-distributed CNN 310, and the decoder includes a MLP 320. As depicted, the time-distributed CNN 310 converts input video frames 305 corresponding to a video clip into a hidden state array of N feature tensors (H(N)) that encapsulates the meaning of the video frames 305. The output of the encoder, the hidden state H(N), is fed to the MLP 320 of the decoder.

In this example, the model functions as a predictor model that may predict the probability of a certain sound category cat_t to be present at a given frame knowing the video and the previous state. As depicted, cat_t is a conditional probability of a sound effect at time t, knowing cat_t-1, cat_t-2, where the notation denotes the conditional probability of x knowing y x|y. Alternatively, the output does not have to be a probability distribution only but may also be the value of some synthesis parameters for the sound (e.g., more of a regression type of optimization). The model may be trained to predict either or even both at the same time.

In the simplest case, the network may predict the probability of having a certain audio file (identified by e.g., an index in a dictionary of possible sounds or soundbank) being played at that given frame. In addition it could also predict the level or 3D position of the sound (e.g., by directly predicting these values from their training targets). The encoder of the network here may extract suitable features from the video frames while the decoder may synthesize the sequence of audio events and data using the previous state and the video features extracted by the encoder.

FIG. 5 illustrates another example of a sequence to sequence model 400 including an encoder and decoder, in accordance with implementations of the disclosure. In this example, the encoder includes a time-distributed CNN 410 and bidirectional LSTM network 420, and the decoder includes a forward LSTM network 430. The output of the encoder, the hidden state H(N), is fed to the forward LSTM network 430 of the decoder. In this case, the sequence to sequence model 400 may function in a manner similar to that described above with reference to model 300, where the use LSTM networks may capture longer term dependencies on longer training sequences compared to MLP, discussed above.

The optimization of the models illustrated by FIGS. 4-5 may be achieved using a loss function that is combination of e.g., binary cross entropy loss for the categorization output and mean squared error (MSE) or logcosh loss for the regression outputs (e.g., panning coordinates, gain).

Figure 6:
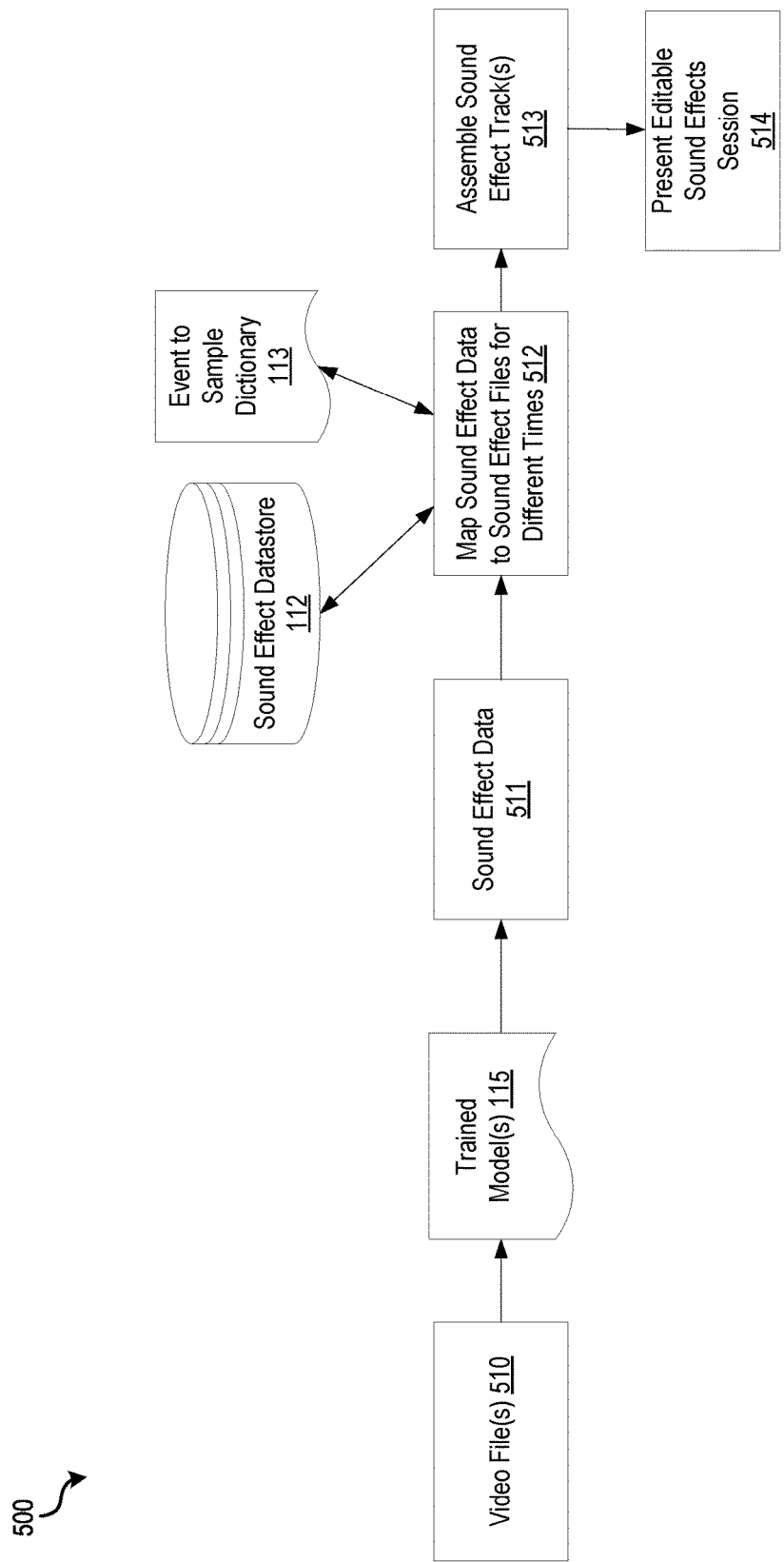
FIG. 6 is a flow diagram illustrating an example method of using one or more trained models to automatically generate an editable sound effects session, in accordance with implementations of the disclosure.

FIG. 6 is a flow diagram illustrating an example method 500 of using one or more trained models 115 to automatically generate an editable sound effects session, in accordance with implementations of the disclosure. The steps of method 500 may be implemented using a processor 120 of a sound effects automation system 100 that executes one or more instructions (e.g., instructions 122, 123, 124) stored in a computer readable medium 110.

At depicted, video file(s) 510 are input into one or more models 115 to generate a prediction about sound effect data

511 associated with each video frame of the video file(s). The one or more video file(s) 510 may include one or more video clips generated from a video associated with a movie, show, or other production. For example, prior to beginning method 500, a video track may be divided into multiple video clips, where each video clip is comprised of a few video frames centered around a respective one of the video frames of the video track for which one or more sound effect(s) are predicted. The process of forming the video clips may also be performed by a processor of a sound effects automation system 100 that executes one or more instructions stored in a computer readable medium 110.

As discussed above, each video frame may be decoded (e.g., from their possibly compressed video format) and downsampled to a lower resolution using a suitable downsampling filter (e.g. bicubic, lanczos, etc.) before being fed directly into the one or more models 115. This may be done in a streaming fashion during inference time, e.g., with each new video frame being decoded in turn as the video is being processed. As the model may generally require multiple consecutive frames as input, the previous K downsampled frames may be cached in a queue. Alternatively, the entire set of low-resolution raw frame data could be precomputed/cached prior to feeding any frames into the model.

In some implementations, metadata associated with the content of the video frames may also be input into the one or more models 115 to generate the prediction about sound effect data 511. For example, categorization metadata associated with the video frames may be input into the one or more models 115. The metadata may identify a production studio, a genre, a filmmaker, a type of media content (e.g., feature film, animation film, short, teaser, television episode, VR content, etc.), or other feature of the content associated with the video frames.

For each video frame, the predicted sound effect data 511 may include, for example, the timing (e.g., timecode or video frame) of sound effect event(s); a type and/or label of each sound effect; audio synthesis parameters associated with each sound effect; learned sound features; and/or additional mixing parameters (e.g., gain, distance or other spatial, or panning information for each video frame) associated with each sound effect. In implementations where no sound effect is predicted for a given video frame, this prediction may be included in the sound effect data 511.

The sound effect data output by the model(s) 115 may also include a probability corresponding to the confidence of a prediction of a sound effect (or no sound effect) for a video frame. In this manner, when sound effects are automatically selected by the software, a sound effects editor manually adjusting sound effects may be presented with the prediction confidence for a given sound effect. In some cases, a sound effects editor manually adjusting sound effects may be presented with multiple possible predictions for a sound effect ranked by prediction confidence, and the editor may select one of the predictions for a given video frame.

At operation 512, the sound effect data 511 is mapped to one or more sound effect files for different times. For example, no sound effect file, one sound effect file, or multiple sound effect files may be mapped to each video frame of the production. In some implementations, the mapping may also be spatial. For example, each sound effect file may be mapped to a two-dimensional or three-dimensional location within a video frame.

As depicted, the sound effect data 511 is mapped to sound effect files stored in sound effect datastore 112. To this end, an event to sample dictionary 113 may be used to map sound effect(s) data 511 to a particular sound effect file or sample in sound effect datastore 112. For example, given a type/label of a sound effect, audio synthesis parameters of a sound effect, and/or additional data associated with a sound effect, a sound effect file that matches the predicted sound effect data may be selected from datastore 112. For example, the dictionary 113 may directly map a predicted index to an audio file. In this example, the user may swap target files in the dictionary for flexibility.

In some implementations, the model may be configured to predict one or more signal features of a sound effect (referred to herein as a "sound effect signature"), and the sound effect signature may be compared to signal features of sound effects that exist in the sound effect datastore. In this example, a similarity or nearest neighbor search for a suitable match in the datastore may be performed. For example, temporal (duration, envelope) and spectral features (pitch, spectral centroid) or even learned embeddings (e.g., from a separate massive-scale classification training) can be used as signatures.

In implementations where multiple sound effect file(s) could potentially be selected for a sound effect prediction, one of the sound effect file(s) may be randomly selected, or a user may be presented with an interface (e.g., editor) for choosing among of the sound effects. For example, the model may predict the probability that a sound effect corresponds to three different types of sounds. Subsequently, the system may present a user with the probability of each type and samples to choose from for each type. Alternatively, the user may be presented with samples to choose from the most probable type.

At operation 513, the mapped sound effects files are assembled into one or more sound effect tracks. Each sound effect track may correspond to a particular sound effect file that is played back, and the times (e.g., start and stop time within production or sound track) that the sound effect file is played back. In some cases, a particular sound effect file may be played back multiple times throughout a production. For example, a footstep sound effect, a laser gun sound effect, or other similar sound effect may require playback many times throughout a production. The sound effect tracks may be one audio file (e.g., sound effect tracks are combined into one file) or multiple separate audio files (e.g., one file per sound effect track).

At operation 514, an editable sound effects session is presented to a user (e.g., sound editor). A graphical user interface (GUI) of the sound effects session may be presented to the user. The GUI may display multiple sound effect tracks, where each sound effect track includes an associated sound effect file that is played back at selected times on a timeline that is visible to the user. In some cases, the entirety of the sound effect file is played back. In other cases, only a portion of the sound effect file is played back. The GUI may also include controls for removing, adding, or editing each sound effect track and/or the sound effect file associated with the sound effect track. In some implementations, a user may be presented with the option of selecting one of multiple sound effect files that could potentially be used for a sound effect track given the sound effect data 511 output by the model.

In the foregoing examples, rather than relying on a model to directly generate a synthesized audio waveform corresponding to a sound effect as an output, the techniques describe herein utilize a model 115 that outputs metadata or other data about sound effects (e.g., sound effect data 511) that needs to be played at a given time (e.g., video frame). In addition to the timing of the sound effect, this data may identify the type of sound effect, the location of the sound effect within a video frame (e.g., spatial coordinates in 2D or 3D space), and other pertinent data. This data may then be used to retrieve sound effects from a sound effect datastore 112. By virtue of taking this approach, a less computationally expensive model is needed for generating a prediction about sound effects. The output of the model can be used to retrieve high quality, pre-generated sound effects from a datastore 112. This may improve the efficiency of the process of automating sound effect creation, as the function of a trained model 115 may be one of classification rather than audio synthesis, thereby allowing for a simpler and more efficient model.

Another advantage that may be realized by training the one or more models 115 to output sound effect event data as opposed to a synthesized audio waveform is that the data may be presented to an end user (e.g., professional sound mixer) in editing software, and the user has the option of customizing the final sound effects. As such, the level of customization may depend on how much the user agrees with the output of the model used to map to sound effect files.

Figure 7:
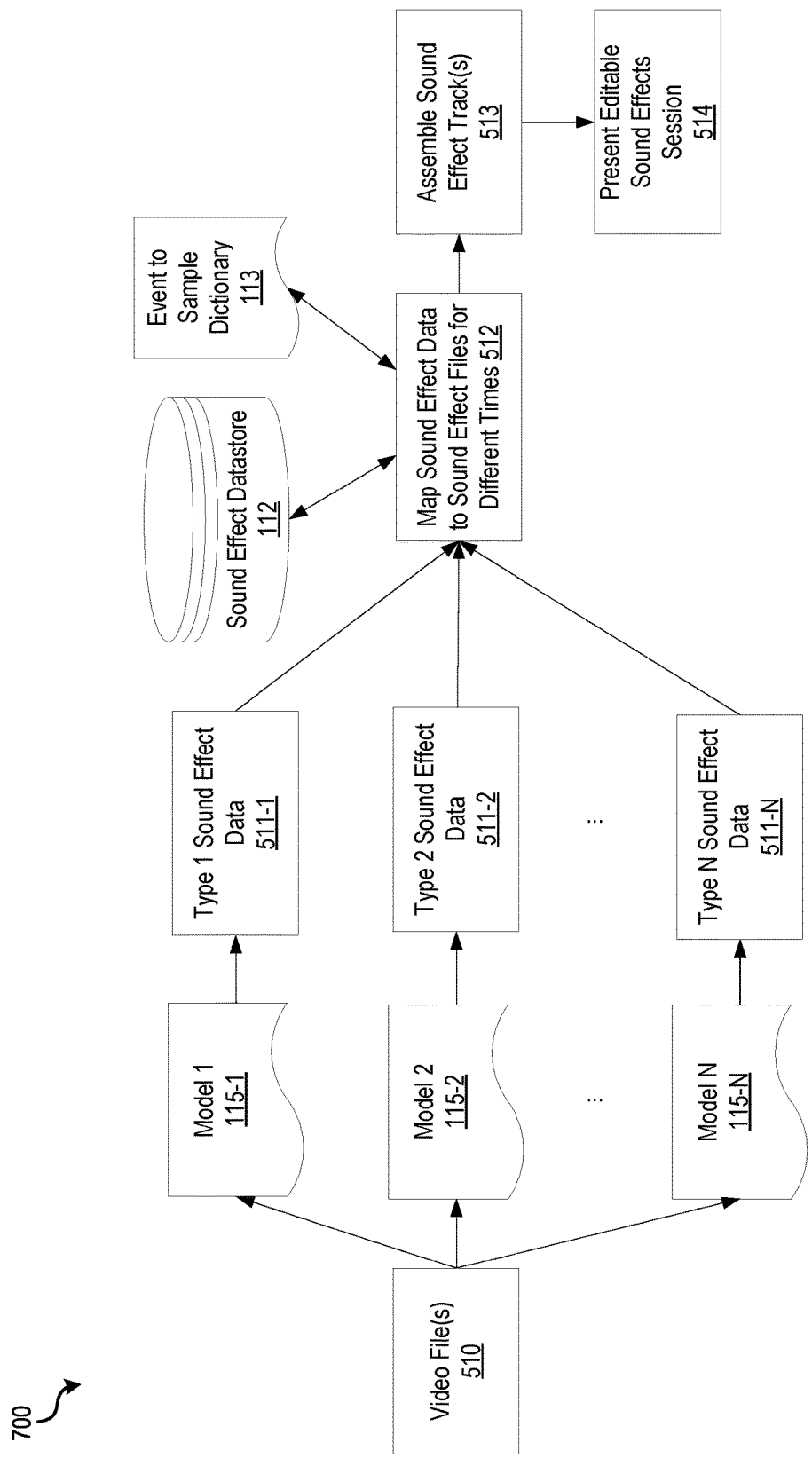
FIG. 7 is a flow diagram illustrating an example method of using multiple trained models to automatically generate an editable sound effects session, in accordance with implementations of the disclosure.

In some implementations, the one or more model(s) 115 may include multiple models that run the inference process sequentially or in parallel to infer specific types of sounds separately. For example the multiple models may include a series of networks trained to infer specific types of sounds separately. This may be beneficial as each type of sound may require focusing on different video features. To this end, FIG. 7 is a flow diagram illustrating an example method 700 of using multiple trained models to automatically generate an editable sound effects session, in accordance with implementations of the disclosure. The steps of method 700 may be implemented using a processor 120 of a sound effects automation system 100 that executes one or more instructions (e.g., instructions 122, 123, 124) stored in a computer readable medium 110.

In this implementation, video file(s) 510 are inputted into N models 115-1 to 115-N, where each model generates a respective prediction about sound effect data 511-1 to 511-N associated with each video frame of the video file(s) 510. As in the previous example, one or more video file(s) 510 may include one or more video clips generated from a video associated with a movie, show, or other production. In this implementation, each model is configured to predicted sound effect data corresponding to a specific type of sound. For example, model 115-1 may predict sound effect data 511-1 corresponding to weapon sound events, model 115-2 may predict sound effect data 511-2 corresponding to foley sound events, and model 115-N may predict sound effect data 511-N corresponding to explosion sound events.

As noted above, the use of separate models that focus on specific sound types may improve prediction accuracy. Additionally, the operation 512 of mapping sound effect data to sound effects files may be simplified given the knowledge of the type of sound effect data output for a given model.

Figure 8:
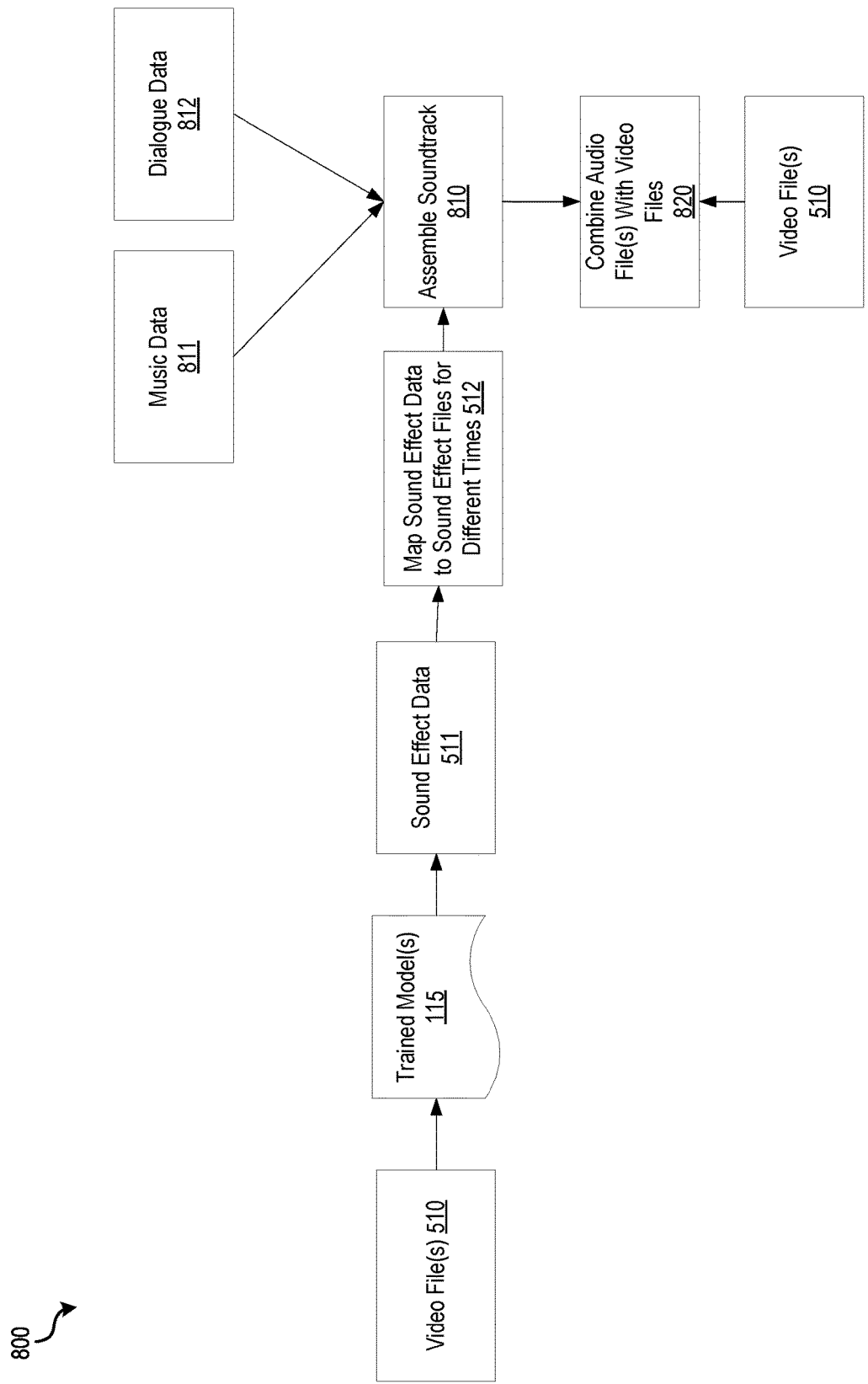
FIG. 8 is a flow diagram illustrating an example method of using automatically generated sound effects to generate a synchronized video for playback, in accordance with implementations of the disclosure.

In some implementations, the output of the one or more model(s) 115 may be used to directly synthesize a soundtrack synchronized to the input video. This may be done for preview purposes and/or to generate a low budget production. As such, by providing sound effect generation in real-time, a live mix preview may be used on set. To this end, FIG. 8 is a flow diagram illustrating an example method 800 of using automatically generated sound effects to generate a synchronized video for playback, in accordance with implementations of the disclosure. The steps of method 800 may be implemented using a processor 120 of a sound effects automation system 100 that executes one or more instructions (e.g., instructions 122, 123, 124, 125, and 126) stored in a computer readable medium 110.

As discussed above, given input video file(s) 510, one or more trained models 115 may be configured to predicted sound effect data 511 that at operation 512 are mapped to sound effect files for different times. In some implementations, the sound effect files may be combined into a sound effects stem.

At operation 810, a soundtrack is assembled by mixing or otherwise combining the sound effect file data, music data 811, and dialogue data 812. In some cases, additional data (e.g., backgrounds) may be combined with the sound effect file data, music data 811, and dialogue data 812. The soundtrack may be created by synthesizing pulse-code (PCM) multichannel audio synchronized to the video data (e.g., video file(s) 510) based on timecodes or video frame numbers. In some implementations, the assembled soundtrack may be a stem sound mix comprising separate stems for dialogue, music, and sound effects that are mixed together.

At operation 820, the assembled soundtrack is combined with the video file(s) 510 to create a video production. For example, the assembled soundtrack may be multiplexed with the input video to create a single container or file. The assembled video production may be subsequently previewed or packaged for distribution. For example, the assembled video production may distributed as part of a digital media package that is streamed or downloaded over a content delivery network including file servers for storing instances of the digital media package and web servers for delivering the stored instances of package. As another example, the digital media package may be distributed as digital cinema files to a theater over a communication network.

In some implementations, the sound effect data 511 output by the one or more model(s) 115 may include synthesis parameters that can be subsequently used to synthesize an audio waveform without the requirement of a sound effect datastore. This approach may still avoid the use of a model that directly generates a synthesized audio waveform. To this end, FIG. 9 is a flow diagram illustrating an example method 900 of using synthesis parameters output by a model to generate sound effect files for video frames, in accordance with implementations of the disclosure. The steps of method 900 may be implemented using a processor 120 of a sound effects automation system 100 that executes one or more instructions stored in a computer readable medium 110.

As discussed above, given input video file(s) 510, one or more trained models 115 may be configured to predict sound effect data 511. In this example, the sound effects data includes synthesis parameters 915. The synthesis parameters 915 may include a noise envelope, harmonics, pitch and/or other parameters that may be directly inferred by the model(s). At operation 910, the synthesis parameters 915 of the sound effect data 511 are input into a synthesizer to generate one or more audio waveform(s) corresponding to one or more sound effect(s). The synthesizer may include a synthesis algorithm (e.g., FM synthesis or sine+noise) to directly obtain pulse-code modulation (PCM) waveforms associated with the sound effects without using a sound effect datastore.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, instructions executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium having executable instructions stored thereon that, when executed by a processor, cause a system to perform operations comprising:
    obtaining first video clip data including multiple sequential video frames, the multiple sequential video frames including at least a first video frame and a second video frame that occurs after the first video frame;
    inputting the first video clip data into at least one trained model that automatically predicts, based on at least features of the first video frame and features of the second video frame, sound effect data corresponding to the second video frame; and
    determining, based on the sound effect data predicted for the second video frame, a first sound effect file corresponding to the second video frame.

2. The non-transitory computer-readable medium of claim 1, wherein determining the first sound effect file corresponding to the second video frame comprises:
    mapping, using at least a sound effect datastore comprising multiple sound effect files that include the first sound effect file, the sound effect data predicted for the second video frame to the first sound effect file.

3. The non-transitory computer-readable medium of claim 2, wherein:
    the sound effect data predicted for the second video frame comprises a type or label; and
    mapping, using at least the sound effect datastore, the sound effect data predicted for the second video frame to the first sound effect file, comprises: selecting, based on the type or label, the first sound effect file from the multiple sound effect files.

4. The non-transitory computer-readable medium of claim 2, wherein:
    the sound effect data predicted for the second video frame comprises a sound effect signature comprising one or more sound features; and
    mapping, using at least the sound effect datastore, the sound effect data predicted for the second video frame to the first sound effect file, comprises:
        comparing the one or more sound features of the sound effect signature to sound features of the multiple sound effect files in the sound effect datastore to determine a similarity between the sound effect signature and each of the multiple sound effect files; and
        determining that the first sound effect file has the highest similarity to the sound effect signature.

5. The non-transitory computer-readable medium of claim 2, wherein:
    the sound effect data predicted for the second video frame comprises: location data indicating a sound effect location, or gain data indicating a sound effect level; and
    the operations further comprise: assembling, based at least on the panning location data, one or more media files including the second video frame the first sound effect, and metadata indicating the sound effect location or the sound effect level in the second video frame.

6. The non-transitory computer-readable medium of claim 1, wherein:
the multiple sequential video frames further include a third video frame that occurs after the second video frame; and
the at least one trained model automatically predicts, based on at least the features of the first video frame, the features of the second video frame, and features of the third video frame, the sound effect data corresponding to the second video frame.

7. The non-transitory computer-readable medium of claim 6, wherein the operations further comprise: prior to inputting the first video clip data into the at least one trained model, decoding and downsampling each of the first video frame, the second video frame, and the third video frame.

8. The non-transitory computer-readable medium of claim 6, wherein the at least one trained model automatically predicts, based on at least the features of the first video frame, the features of the second video frame, the features of the third video frame, and sound effect data previously predicted for the first video frame, the sound effect data corresponding to the second video frame.

9. The non-transitory computer-readable medium of claim 8, wherein:
the at least one trained model comprises a sequence to sequence model including an encoder and a decoder, wherein:
the encoder is configured to extract the features of the first video frame, the features of the second video frame, and the features of the third video frame; and
the decoder is configured to:
predict the sound effect data for the first video frame; and
predict, using at least the features of the first video frame, the features of the second video frame, the features of the third video frame, and the sound effect data previously predicted for the first video frame, the sound effect data for the second video frame.

10. The non-transitory computer-readable medium of claim 9, wherein the encoder comprises a time-distributed convolutional neural network (CNN).

11. The non-transitory computer-readable medium of claim 10, wherein the decoder comprises a multilayer perceptron (MLP) or forward long short-term memory (LSTM) network.

12. The non-transitory computer-readable medium of claim 1, wherein the operations further comprise:
obtaining metadata indicating a category of the first video clip data; and
inputting the metadata into the at least one trained model, wherein the at least one trained model automatically predicts, based on at least the features of the first video frame, the features of the second video frame, and the metadata, the sound effect data corresponding to the second video frame.

13. The non-transitory computer-readable medium of claim 1, wherein:
the at least one trained model includes a first model configured to predict data associated with a first type of sound effect, and a second model configured to predict data associated with a second type of sound effect;
inputting the first video clip data into the at least one trained model, comprises: inputting the first video clip data into each of the first model and the second model; and
the sound effect data corresponding to the second video frame comprises first sound effect data predicted by the first model for the first type of sound effect, and second sound effect data predicted by the second model for the second type of sound effect.

14. The non-transitory computer-readable medium of claim 1, wherein the operations further comprise:
assembling a first sound effect track including the first sound effect file and a playback time of the first sound effect file; and
presenting a user interface including an editable sound effects session, the editable sound effects session including one or more controls for playing back or editing the first sound effect track.

15. The non-transitory computer-readable medium of claim 1, wherein determining, based on the sound effect data predicted for the second video frame, the first sound effect file corresponding to the second video frame, comprises:
determining, based on the sound effect data predicted for the second video frame, multiple sound effect files potentially corresponding to the sound effect data predicted for the second video frame, the multiple sound effect files including the first sound effect file;
presenting, via a user interface, the multiple sound effect files potentially corresponding to the sound effect data predicted for the second video frame; and
receiving data corresponding to user input at the user interface selecting the first sound effect file from the multiple sound effect files.

16. The non-transitory computer-readable medium of claim 1, wherein the operations further comprise:
obtaining music data and dialogue data corresponding to the multiple sequential video frames;
assembling a soundtrack comprising the music data, the dialogue data, and sound effect data corresponding to the first sound effect file; and
combining the multiple sequential video frames with the soundtrack into a media package.

17. The non-transitory computer-readable medium of claim 1, wherein:
the sound effect data predicted for the second video frame comprises one or more audio synthesis parameters; and
determining the first sound effect file corresponding to the second video frame, comprises: synthesizing, using at least the one or more audio synthesis parameters, the first sound effect file.

18. A system, comprising:
one or more processors; and
one or more non-transitory computer-readable mediums having executable instructions stored thereon that, when executed by the one or more processors, cause the system to perform operations comprising:
obtaining first video clip data including multiple sequential video frames, the multiple sequential video frames including at least a first video frame and a second video frame that occurs after the first video frame;
inputting the first video clip data into at least one trained model that automatically predicts, based on at least features of the first video frame and features of the second video frame, sound effect data corresponding to the second video frame; and
determining, based on the sound effect data predicted for the second video frame, a first sound effect file corresponding to the second video frame.

19. A method, comprising:
obtaining, at a computing device, first video clip data including multiple sequential video frames, the multiple sequential video frames including at least a first video frame and a second video frame that occurs after the first video frame;

inputting, at the computing device, the first video clip data into at least one trained model that automatically predicts, based on at least features of the first video frame and features of the second video frame, sound effect data corresponding to the second video frame; and determining, at the computing device, based on the sound effect data predicted for the second video frame, a first sound effect file corresponding to the second video frame.

20. The method of claim 19, wherein determining the first sound effect file corresponding to the second video frame comprises:

mapping, using at least a sound effect datastore comprising multiple sound effect files that include the first sound effect file, the sound effect data predicted for the second video frame to the first sound effect file.

* * * * *